UNITED STATES PATENT OFFICE.

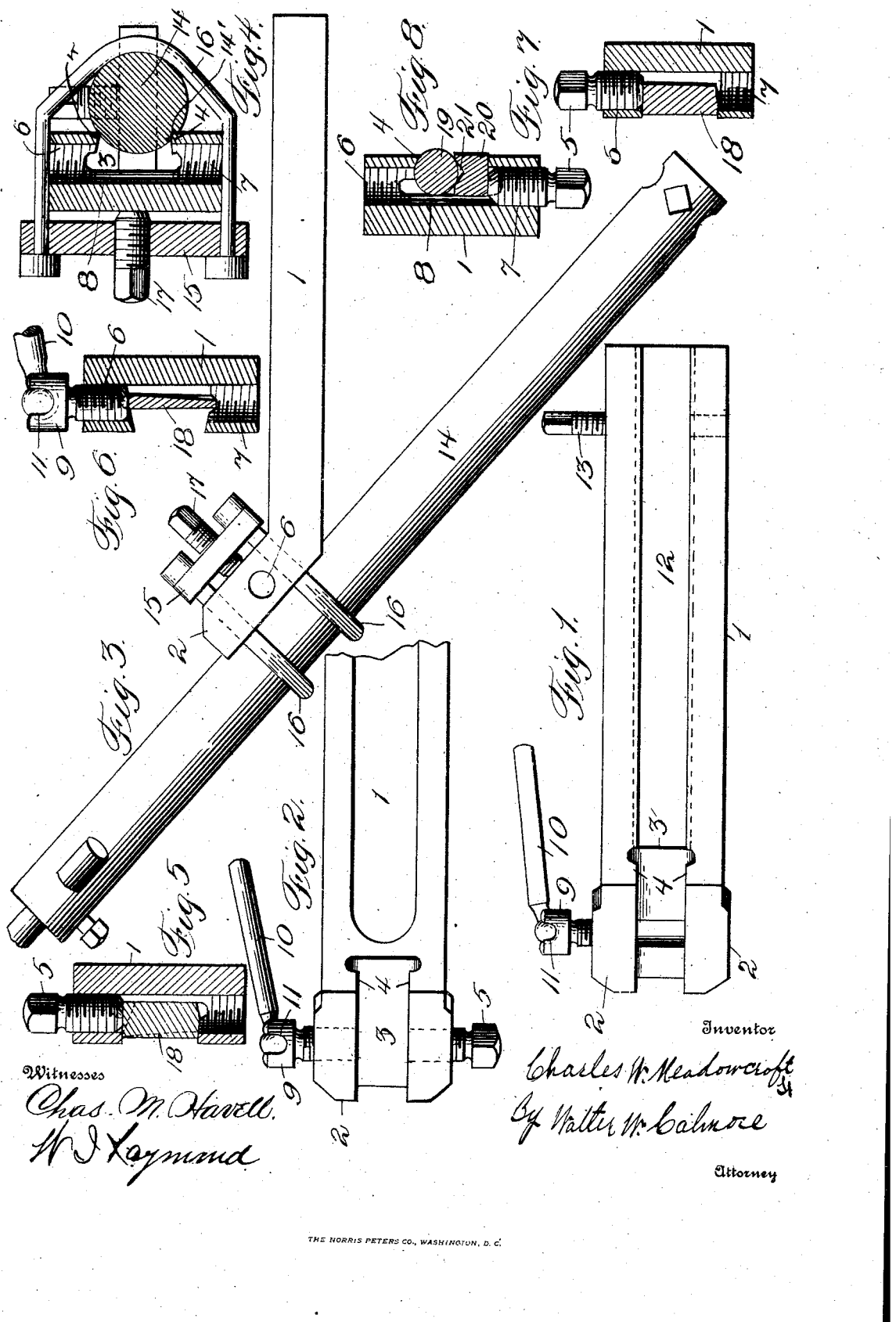

CHARLES W. MEADOWCROFT, SR., OF PHILADELPHIA, PENNSYLVANIA.

TOOL-HOLDER.

No. 854,100.   Specification of Letters Patent.   Patented May 21, 1907.

Application filed April 11, 1906. Serial No. 311,021.

*To all whom it may concern:*

Be it known that I, CHARLES W. MEADOWCROFT, Sr., a citizen of the United States, residing at Philadelphia, in the county of Philadelphia and State of Pennsylvania, have invented certain new and useful Improvements in Tool-Holders, of which the following is a specification.

This invention relates to new and useful improvements in tool holders and it particularly pertains to a construction designed to be used in connection with lathe tools of various types and in this function to serve as a combination tool holder. In this connection, it is a primary object of the present invention to provide a tool holder so adapted for use with various types of tools that it is not necessary to change, adjust, or replace any of its component parts in substituting one tool for another.

The above and other advantages will appear as the description proceeds in which reference is had to the accompanying drawings forming a part of this specification, like numerals designating like parts throughout the several views, wherein:

Figure 1, is a side elevation of a tool holder constructed in accordance with my invention, Fig. 2, is a similar view on an enlarged scale, Fig. 3, is a top plan view showing the invention used in connection with a boring tool, Figs. 4, 5, 6, 7 and 8 are detail transverse sections showing the means of mounting and holding various types of tools in my improved tool holder.

In the practical embodiment of my invention, I employ a tool holder comprising an elongated shank 1 provided with an angular off-set head 2 within which the tool is received. The head 2 is formed with a longitudinal recess 3 formed with overhanging walls 4. The recess 3 affords a seat for the tool and in connection therewith tool fastening means are employed comprising a set screw 5, which is movable in a threaded opening 6 transversely extending through the head 2 and communicating with the recess 3 at an approximately central point. A similar threaded opening 7 communicates with the recess 3 on the opposite side thereof and is in axial alinement with the opening 6. A groove 8 of the same degree of curvature as said openings extends transversely therebetween and affords a guide passage for the screw in its adjusting movement. In connection with the certain types of tools, another set screw 9 coöperating with the set screw 5 may be employed to retain the tool in position. For the sake of convenience in manipulation, the set screw 9 may be provided with a universally mounted handle 10 engaging peripheral recesses 11 in the set screw head. As shown in Fig. 1, the shank 1 may be provided with a co-extensive longitudinal recess 12 similar in construction to the recess 3 for the reception of a straight tool for cutting, said tool being held therein by a set screw 13 extending transversely through one side of said shank and bearing against the tool in the recess. This construction is provided in order that either end of the tool holder may be employed to hold a cutting tool.

As shown in Figs. 3 and 4, a boring tool of conventional form is employed and is secured by novel clamping means to the holding head 2. The cylindrical shank 14 of said boring tool bears exteriorly against the overhanging walls of the recess 3 and is provided with a longitudinal groove 14' which receives the adjacent wall 4 and is rigidly held in locking engagement therewith by a clamp comprising a plate 15 disposed rearwardly of the head 2 and provided with parallel yoke members 16 of substantial U-shape which surround the shank 14 as shown in Fig. 4. The function of the said groove 14' is to prevent rotation of the shank of the tool 14 while in operation. The plate 15 has an adjusting set screw 17 threaded therethrough which bears against the rear face of the head 2 in frictional locking engagement and serves to retain the component elements above recited in assembled relation.

In Figs. 5, 6 and 7 straight edge cutting tools 18 of varying dimensions are shown as occupying the space between the inner walls of the recess 3 or the overhanging walls 4 thereof. The set screws 5, or 9, as the case may be are tightened upon said tools 18 so as to frictionally engage and retain the same in position.

In Fig. 8, I have shown the application of a small cylindrical cutting tool 19. The tool 19 is inserted in the recess 3 so as to abut one of the walls 4 thereof and is spaced away from the other wall 4. A follower 20 occupies the space thus formed and is provided with a longitudinal groove 21 for engagement with the periphery of the cylindrical tool 19. The screw 5 bears against said follower and the parts assembled as described are frictionally locked by tightening said set screw.

I desire it to be understood that the various applications of tools shown in Figs. 3 to 8 inclusive are to be regarded in the light of example rather than of enumeration.

Having fully described the invention, what is claimed as new and useful and desired to be secured by Letters Patent is:

1. A tool holder comprising a shank having an off-set head provided with a longitudinal groove formed with overhanging walls, the adjacent edges of said walls being oppositely beveled to present sharp corners, and an adjustable yoke encircling said head for securing the tool between said yoke and said sharp corners.

2. A tool holder comprising a shank having an off-set head provided with a longitudinal groove formed with overhanging walls having beveled edges, the head being provided with screw threaded openings communicating with the opposite sides of said groove from the exterior of the head, and a set screw in one of said threaded openings engaging one side of the tool and securing the latter against the beveled edge of one of said overhanging walls.

In testimony whereof I affix my signature in presence of two witnesses.

CHARLES W. MEADOWCROFT, Sr.

Witnesses:
CHARLES W. MEADOWCROFT, Jr.,
WM. E. DUDLEY.